US008392996B2

(12) United States Patent
Oliver et al.

(10) Patent No.: US 8,392,996 B2
(45) Date of Patent: Mar. 5, 2013

(54) MALICIOUS SOFTWARE DETECTION

(75) Inventors: Ian Oliver, New South Wales (AU);
Ryan Pereira, New South Wales (AU)

(73) Assignee: Symantec Corporation, Mountain View, CA (US)

( * ) Notice: Subject to any disclaimer, the term of this patent is extended or adjusted under 35 U.S.C. 154(b) by 1367 days.

(21) Appl. No.: 11/835,965

(22) Filed: Aug. 8, 2007

(65) Prior Publication Data
US 2008/0040804 A1 Feb. 14, 2008

Related U.S. Application Data

(60) Provisional application No. 60/836,222, filed on Aug. 8, 2006.

(51) Int. Cl.
G06F 11/00 (2006.01)
G06F 12/14 (2006.01)

(52) U.S. Cl. ........... 726/25; 726/22; 726/23; 726/24; 726/30; 726/26; 713/161; 713/156; 713/169; 713/176

(58) Field of Classification Search ........ 726/23–26
See application file for complete search history.

(56) References Cited

U.S. PATENT DOCUMENTS

| | | | | | |
|---|---|---|---|---|---|
| 5,826,013 | A | * | 10/1998 | Nachenberg | 726/22 |
| 6,772,345 | B1 | * | 8/2004 | Shetty | 726/24 |
| 7,383,579 | B1 | * | 6/2008 | Catanzano | 726/24 |
| 7,409,719 | B2 | * | 8/2008 | Armstrong et al. | 726/24 |
| 7,444,679 | B2 | * | 10/2008 | Tarquini et al. | 726/25 |
| 7,490,355 | B2 | * | 2/2009 | Wong | 726/24 |
| 7,555,777 | B2 | * | 6/2009 | Swimmer et al. | 726/23 |
| 7,559,091 | B2 | * | 7/2009 | Chu et al. | 726/27 |
| 7,631,360 | B2 | * | 12/2009 | Wu et al. | 726/26 |
| 7,739,738 | B1 | * | 6/2010 | Sobel et al. | 726/24 |
| 7,877,621 | B2 | * | 1/2011 | Jacoby et al. | 713/340 |
| 2003/0233574 | A1 | * | 12/2003 | Kouznetsov et al. | 713/201 |
| 2004/0153644 | A1 | * | 8/2004 | McCorkendale et al. | 713/156 |
| 2006/0150256 | A1 | * | 7/2006 | Fanton et al. | 726/27 |
| 2006/0288417 | A1 | * | 12/2006 | Bookbinder et al. | 726/24 |
| 2007/0150957 | A1 | * | 6/2007 | Hartrell et al. | 726/24 |

OTHER PUBLICATIONS

Christodocrescu M, Semantics-aware malware detection, May 8, 2005, IEEE, pp. 8-12.*
James NEwsome, Dynamic Taint Analysis for automatic detection, analysis and signature generation of exploits on commodity software, Jan. 1, 2005, Carnegie Mellon University, vol. 3, pp. 4-12.*

* cited by examiner

Primary Examiner — Nathan Flynn
Assistant Examiner — Viral Lakhia
(74) Attorney, Agent, or Firm — Holland & Hart LLP

(57) ABSTRACT

A method, system, computer program product and/or a computer readable medium of instructions for detecting one or more entities which are able to reinfect a processing system with malicious software. The method includes: monitoring, in the processing system, activity indicative of the malicious software reinfecting the processing system; in response to detecting the activity, storing a record of the activity and one or more entities associated with the activity; determining if the malicious software has reinfected the processing system; and in response to determining that the malicious software has reinfected the processing system, analysing the record to detect the one or more entities which were associated with the activity that caused and/or assisted in reinfecting the processing system with the malicious software. There is also disclosed a method, system, computer program product and/or a computer readable medium of instructions for detecting a variant of malicious software in a processing system.

7 Claims, 12 Drawing Sheets

MALICIOUS SOFTWARE DETECTION

This application claims the benefit of priority from Provisional Patent Application Ser. No. 60/836,222, filed on Aug. 8, 2006, which is hereby incorporated by reference in its entirety.

TECHNICAL FIELD

The present invention generally relates to a method, system, computer readable medium of instructions and/or computer program product for detecting one or more entities which reinfect a processing system with malicious software. The present invention also relates to a method, system, computer readable medium of instructions and/or computer program product for detecting a variant of malicious software.

BACKGROUND ART

As used herein a "threat" comprises malicious software, also known as "malicious software" or "pestware", which comprises software that is included or inserted in a part of a processing system for a harmful purpose. The term threat should be read to comprise both possible, potential and actual threats. Types of malicious software can comprise, but are not limited to, malicious libraries, viruses, worms, Trojans, adware, malicious active content and denial of service attacks. In the case of invasion of privacy for the purposes of fraud or theft of identity, malicious software that passively observes the use of a computer is known as "spyware".

A hook (also known as a hook procedure or hook function), as used herein, generally refers to a callback function provided by a software application that receives certain data before the normal or intended recipient of the data. A hook function can thus examine or modify certain data before passing on the data. Therefore, a hook function allows a software application to examine data before the data is passed to the intended recipient.

An API ("Application Programming Interface") hook (also known as an API interception), as used herein as a type of hook, refers to a callback function provided by an application that replaces functionality provided by an operating system's API. An API generally refers to an interface that is defined in terms of a set of functions and procedures, and enables a program to gain access to facilities within an application. An API hook can be inserted between an API call and an API procedure to examine or modify function parameters before passing parameters on to an actual or intended function. An API hook may also choose not to pass on certain types of requests to an actual or intended function.

A process, as used herein, is at least one of a running software program or other computing operation, or a part of a running software program or other computing operation, that performs a task.

An entity can comprise, but is not limited to, a file, an object, a class, a collection of grouped data, a library, a variable, a process, and/or a device.

A hook chain as used herein, is a list of pointers to special, application-defined callback functions called hook procedures. When a message occurs that is associated with a particular type of hook, the operating system passes the message to each hook procedure referenced in the hook chain, one after the other. The action of a hook procedure can depend on the type of hook involved. For example, the hook procedures for some types of hooks can only monitor messages, others can modify messages or stop their progress through the chain, restricting them from reaching the next hook procedure or a destination window.

In a networked information or data communications system, a user has access to one or more terminals which are capable of requesting and/or receiving information or data from local or remote information sources. In such a communications system, a terminal may be a type of processing system, computer or computerised device, personal computer (PC), mobile, cellular or satellite telephone, mobile data terminal, portable computer, Personal Digital Assistant (PDA), pager, thin client, or any other similar type of digital electronic device. The capability of such a terminal to request and/or receive information or data can be provided by software, hardware and/or firmware. A terminal may comprise or be associated with other devices, for example a local data storage device such as a hard disk drive or solid state drive.

An information source can comprise a server, or any type of terminal, that may be associated with one or more storage devices that are able to store information or data, for example in one or more databases residing on a storage device. The exchange of information (ie. the request and/or receipt of information or data) between a terminal and an information source, or other terminal(s), is facilitated by a communication means. The communication means can be realised by physical cables, for example a metallic cable such as a telephone line, semi-conducting cables, electromagnetic signals, for example radio-frequency signals or infra-red signals, optical fibre cables, satellite links or any other such medium or combination thereof connected to a network infrastructure.

A system registry is a database used by operating systems, for example Windows™ platforms. The system registry comprises information needed to configure the operating system. The operating system refers to the registry for information ranging from user profiles, to which applications are installed on the machine, to what hardware is installed and which ports are registered.

One problem faced when restricting malicious activity by malicious software in a processing system is that there is a risk that the malicious software may reinfect the processing system. Entities which were not necessarily performing malicious activity may not be restricted and thus may attempt to reinfect the processing system with one or more malicious entities, such as to reinfect the processing system with the malicious software.

Another problem faced when detecting malicious software is that variants of the malicious software may also attempt to infect a processing system, wherein the processing system may be configured to detect an earlier version of the malicious software. A variant of malicious software may be a modification to an earlier version of the malicious software in an attempt to increase the maliciousness of the earlier malicious software or an attempt to prevent detection, although there may be other reasons why variants of malicious software are created and released.

In order to protect a client's processing system, it is important that vendors of malicious software detection products detect the variant as quickly as possible such that a method of restricting the variant malicious software can be determined. Using methods of restricting the earlier version of the malicious software may not necessarily restrict the variant malicious software, and as such leave the processing system compromised. Due to the complexity of malicious software, a variant of malicious software can be difficult to identify, and can be a time-consuming exercise. As this process of identifying a variant is generally performed manually, there is a significant problem in attempting to accurately and quickly identify variant malicious software. Also, these problems impact on accurately and quickly generating a method of restricting the variant malicious software.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

DISCLOSURE OF INVENTION

In a first broad form there is provided a method of detecting one or more entities which are able to reinfect a processing system with malicious software, wherein the method comprises:

monitoring, in the processing system, activity indicative of the malicious software reinfecting the processing system;

in response to detecting the activity, storing a record of the activity and one or more entities associated with the activity;

determining if the malicious software has reinfected the processing system; and in response to determining that the malicious software has reinfected the processing system, analysing the record to detect the one or more entities which were associated with the activity that caused and/or assisted in reinfecting the processing system with the malicious software.

In one form, determining if the malicious software has reinfected the processing system comprises at least one of:

applying a signature associated with the malicious software, wherein the signature is satisfied indicating that the malicious software has reinfected the processing system; and monitoring activity associated with the malicious software.

In another form, the method comprises:

(a) setting at least one of the one or more entities as a base entity;

(b) determining an entity property of the base entity;

(c) determining one or more related entities to the base entity which are related by the entity property; and (d) performing an analysis of the related entities to determine if one or more of the related entities caused and/or assisted in reinfecting the processing system with the malicious software.

In one embodiment, the method comprises:

setting the one or more related entities as the base entity; and repeating steps (b) and (c), followed by step (d) until an end condition is satisfied.

In another embodiment, the activities that are monitored comprise at least one of:

an executable entity creating a new executable entities;

downloading an entity from a remote network address;

an entity downloading data from a remote network address; and an entity creating one or more registry entities in the system registry.

In another broad form there is provided a system to detect one or more entities which are able to reinfect a processing system with malicious software, wherein the system is configured to:

monitor, in the processing system, activity indicative of the malicious software reinfecting the processing system;

in response to detecting the activity, store a record of the activity and one or more entities associated with the activity;

determine if the malicious software has reinfected the processing system; and in response to determining that the malicious software has reinfected the processing system, analyse the record to detect the one or more entities which were associated with the activity that caused and/or assisted in reinfecting the processing system with the malicious software.

In another broad form there is provided a computer program product comprising a computer readable medium having a computer program recorded therein or thereon, the computer program enabling detection of one or more entities which are able to reinfect a processing system with malicious software, wherein the computer program product configures the processing system to:

monitor, in the processing system, activity indicative of the malicious software reinfecting the processing system;

in response to detecting the activity, store a record of the activity and one or more entities associated with the activity;

determine if the malicious software has reinfected the processing system; and in response to determining that the malicious software has reinfected the processing system, analyse the record to detect the one or more entities which were associated with the activity that caused and/or assisted in reinfecting the processing system with the malicious software.

In another broad form there is provided a method of detecting a variant of malicious software in a processing system, wherein the method comprises:

applying a signature for the malicious software in the processing system, wherein the signature is associated with a first group of related malicious entities;

in response to detecting an entity which satisfies the signature, determining a second group of related malicious entities; and comparing the first group of related malicious entities to the second group of malicious entities, wherein in response to a partial match, a discrepant portion of the second group of related entities is detected as the variant of the malicious software.

In one form, determining the second group of related malicious entities comprises:

(a) setting the entity which satisfied the signature as a base entity;

(b) determining an entity property of the base entity;

(c) determining one or more related entities to the base entity which are related by the entity property; and (d) performing an analysis of the related entities to determine if one or more of the related entities caused and/or assisted in reinfecting the processing system with the malicious software.

In another form, the method comprises:

setting the one or more related entities as the base entity; and repeating steps (b) and (c), followed by step (d) until an end condition is satisfied.

In one embodiment, the end condition is at least one of:

when no related entities are determined in a particular repetition;

when no new related entities are determined in a particular repetition;

when no related entities are determined in a period of time;

when the base entity has an entity property which is indicative of the end condition;

and when a selected number of repetitions have been performed.

In another broad form there is provided a system to detect a variant of malicious software in a processing system, wherein the system in configured to:

apply a signature for the malicious software in the processing system, wherein the signature is associated with a first group of related malicious entities;

in response to detecting an entity which satisfies the signature, determine a second group of related malicious entities relative to the entity; and compare the first group of related malicious entities to the second group of related malicious entities, wherein in response to a partial match, a discrepant portion of the second group of related entities is detected as the variant of the malicious software.

In one embodiment there is provided a server processing system in data communication with the processing system of the above system, wherein the server processing system is configured to:

receive, from the processing system, variant data indicative of the discrepant portion of the second group of related entities, wherein the processing system generates the variant data;

modifying the signature associated with the first group of related malicious entities so as to detect the discrepant portion of the second group of related entities; and distributing the modified signature to one or more processing systems in data communication with the server processing system.

In one aspect there is provided a computer readable medium having a computer program recorded therein or thereon, the computer program enabling detection of a variant of malicious software in a processing system, wherein the computer program product configures the processing system to:

apply a signature for the malicious software in the processing system, wherein the signature is associated with a first group of related malicious entities;

in response to detecting an entity which satisfies the signature, determine a second group of related malicious entities relative to the entity; and compare the first group of related malicious entities to the second group of related malicious entities, wherein in response to a partial match, a discrepant portion of the second group of related entities is detected as the variant of the malicious software.

According to another broad form, the present invention provides a computer readable medium of instructions for giving effect to any of the aforementioned methods or systems. In one particular, but non-limiting, form, the computer readable medium of instructions are embodied as a software program.

BRIEF DESCRIPTION OF FIGURES

An example embodiment of the present invention should become apparent from the following description, which is given by way of example only, of a preferred but non-limiting embodiment, described in connection with the accompanying figures.

MODES FOR CARRYING OUT THE INVENTION

Figure 1:
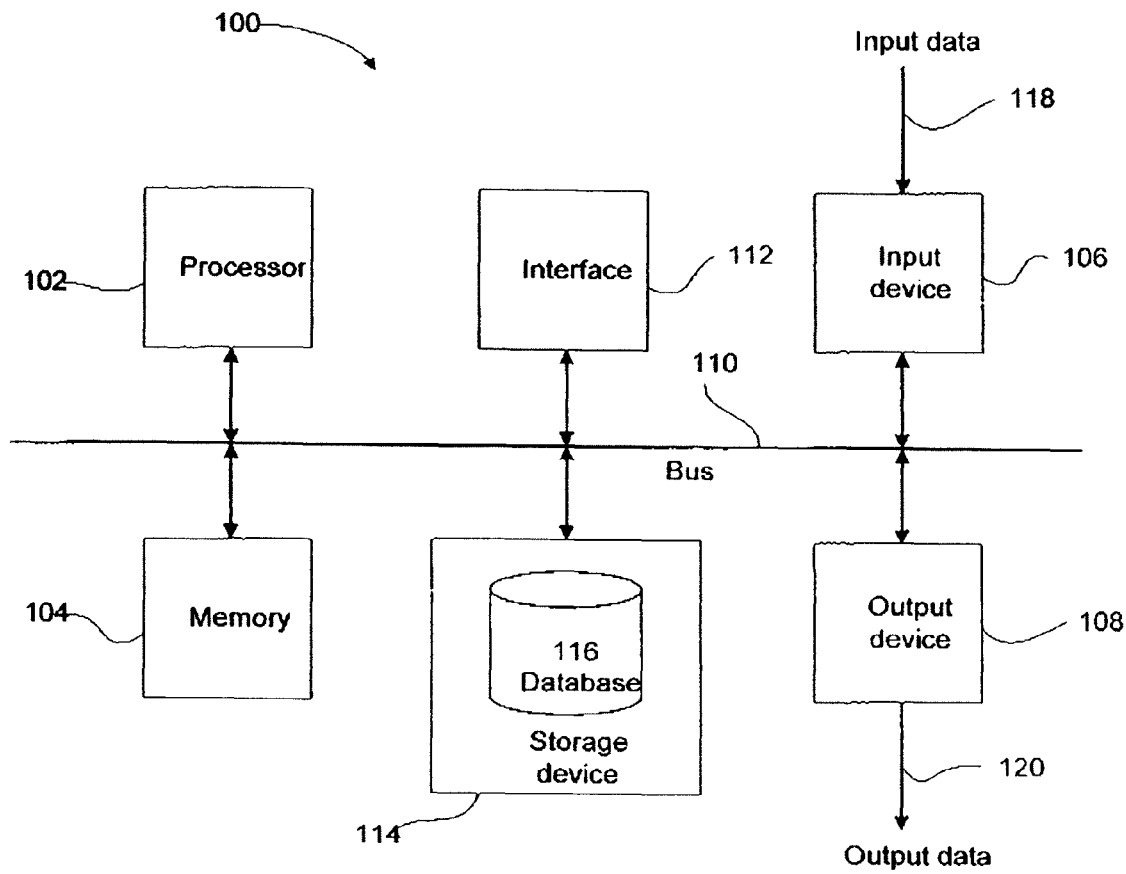
FIG. 1 illustrates a functional block diagram of an example of a processing system that can be utilised to embody or give effect to a particular embodiment.

The following modes, given by way of example only, are described in order to provide a more precise understanding of the subject matter of a preferred embodiment or embodiments.

In the figures, incorporated to illustrate features of an example embodiment, like reference numerals are used to identify like parts throughout the figures.

A particular embodiment of the present invention can be realised using a processing system, an example of which is shown in FIG. 1. The processing system 100 illustrated in relation to FIG. 1 can be used as a client processing system 710 and/or a server processing system 720.

In particular, the processing system 100 generally comprises at least one processor 102, or processing unit or plurality of processors, memory 104, at least one input device 106 and at least one output device 108, coupled together via a bus or group of buses 110. In certain embodiments, input device 106 and output device 108 could be the same device. An interface 112 can also be provided for coupling the processing system 100 to one or more peripheral devices, for example interface 112 could be a PCI card or PC card. At least one storage device 114 which houses at least one database 116 can also be provided. The memory 104 can be any form of memory device, for example, volatile or non-volatile memory, solid state storage devices, magnetic devices, etc. The processor 102 could comprise more than one distinct processing device, for example to handle different functions within the processing system 100. Input device 106 receives input data 118 and can comprise, for example, a keyboard, a pointer device such as a pen-like device or a mouse, audio receiving device for voice controlled activation such as a microphone, data receiver or antenna such as a modem or wireless data adaptor, data acquisition card, etc. Input data 118 could come from different sources, for example keyboard instructions in conjunction with data received via a network. Output device 108 produces or generates output data 120 and can comprise, for example, a display device or monitor in which case output data 120 is visual, a printer in which case output data 120 is printed, a port for example a USB port, a peripheral component adaptor, a data transmitter or antenna such as a modem or wireless network adaptor, etc. Output data 120 could be distinct and derived from different output devices, for example a visual display on a monitor in conjunction with data transmitted to a network A user could view data output, or an interpretation of the data output, on, for example, a monitor or using a printer. The storage device 114 can be any form of data or information storage means, for example, volatile or non-volatile memory, solid state storage devices, magnetic devices, etc.

In use, the processing system 100 can be adapted to allow data or information to be stored in and/or retrieved from, via wired or wireless communication means, the at least one database 116. The interface 112 may allow wired and/or wireless communication between the processing unit 102 and peripheral components that may serve a specialised purpose. The processor 102 receives instructions as input data 118 via input device 106 and can display processed results or other output to a user by utilising output device 108. More than one input device 106 and/or output device 108 can be provided. It should be appreciated that the processing system 100 may be any form of terminal, server processing system, specialised hardware, or the like.

The processing system 100 may be a part of a networked communications system. The processing system 100 could connect to a network, for example the Internet or a WAN. The network can comprise one or more client processing systems 710 and one or more server processing systems 720, wherein the one or more client processing systems 710 and the one or more server processing systems 720 are forms of processing system 100. Input data 118 and output data 120 could be communicated to other devices via the network. The transfer of information and/or data over the network can be achieved using wired communications means or wireless communications means. The server processing system 720 can facilitate the transfer of data between the network and one or more databases. The server processing system 720 and one or more databases provide an example of an information source.

Figure 2:
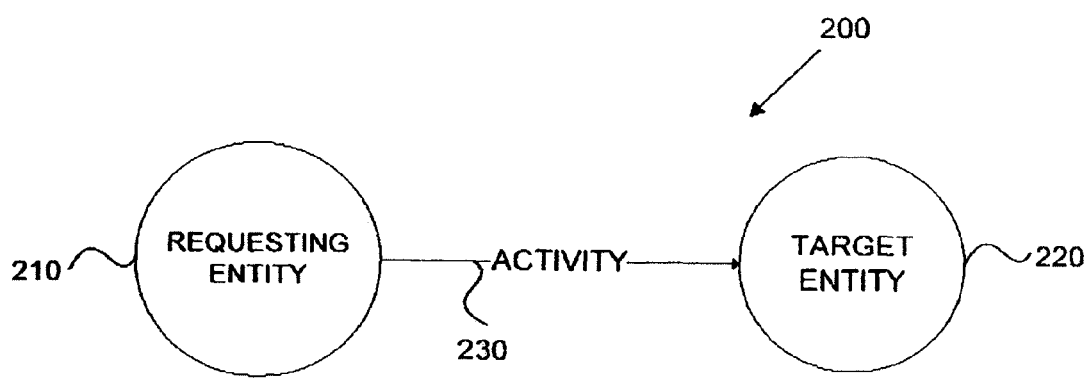
FIG. 2 illustrates a block diagram illustrating the relationship between a requesting entity and a target entity.

Referring to FIG. 2, there is shown a block diagram illustrating a request 200. Generally, the request 200 comprises an activity 230, and a target entity 220 and a requesting entity 210. In particular, the requesting entity 210 causes the activity 230 to be performed in relation to the target entity 220.

For example, an executable object in a processing system 100 may request 200 to download data from a website on the Internet. In this example, the executable object would be considered as the requesting entity 210, the activity 230 would be considered as the act of downloading data, and the target entity 220 would be the web-site on the Internet. The requesting entity 210 is a starting point in the processing system 100, or network of processing systems 100, which requests 200 the action 230 to be performed, and the target entity 220 is an end point in the processing system 100, or network of processing systems 100, in relation to which the action 230 is performed.

As will be described in more detail, a request 200 is analysed to determine at least one of the requesting entity 210 and the target entity 220. By determining at least one of the requesting entity 210 and the target entity 220, an accurate and efficient process of detecting malicious software in a processing system 100 can be performed.

Figure 3:
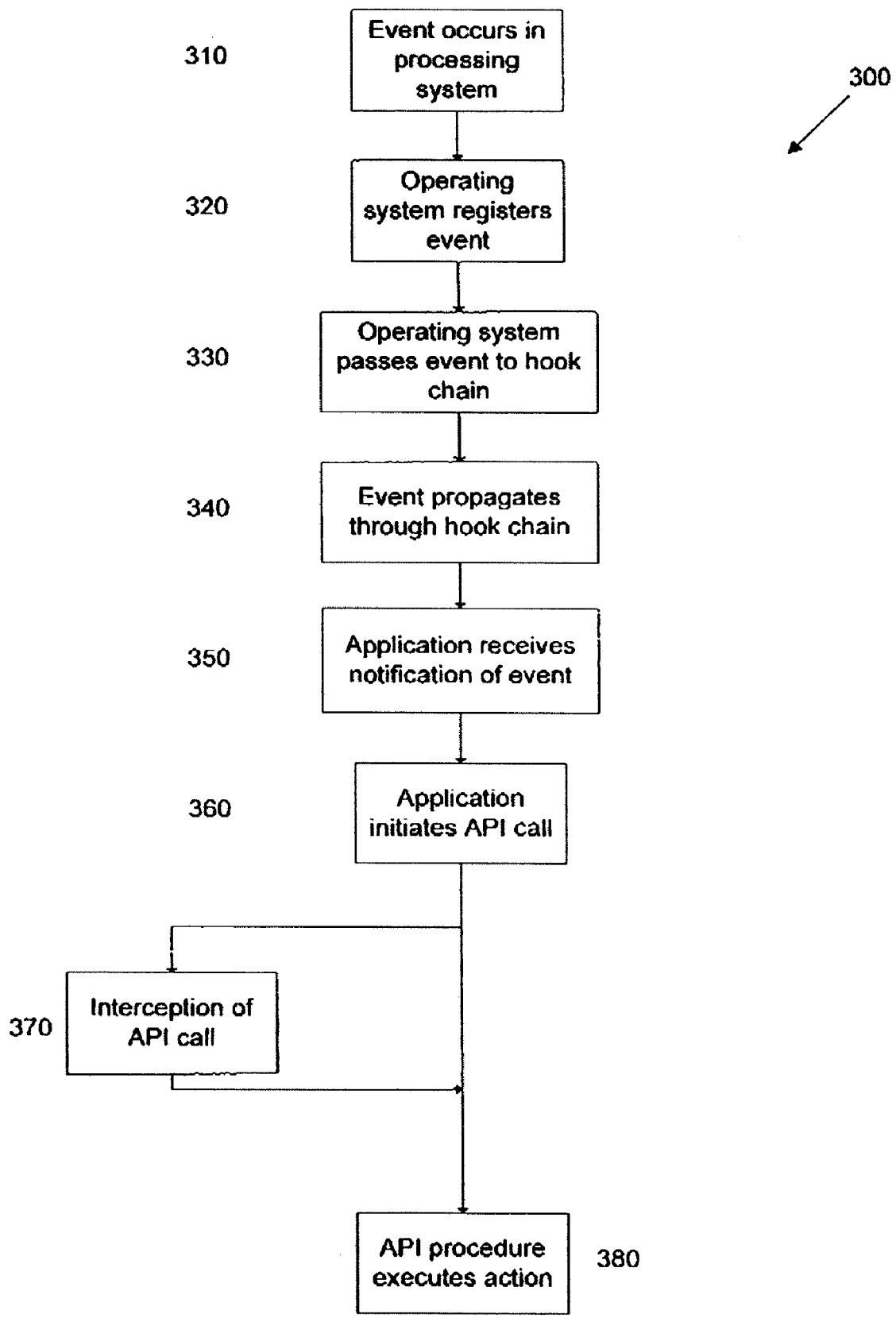
FIG. 3 illustrates a flow diagram of an example method of intercepting an activity in a processing system.

Referring to FIG. 3 there is shown an example of a method 300 of intercepting an activity in a processing system 100.

At step 310, an event occurs in the processing system 100. The event can be a request 200 by a requesting entity 210 to perform an action 230 in relation to a target entity 220. At step 320, an operating system running in the processing system 100 registers the occurrence of the event. At step 330, the operating system passes the registered event to the hook chain. At step 340, the event is passed to each hook in the hook chain such that different applications, processes, and devices may be notified of the registered event. Once the event has propagated throughout the hook chain, the method 300 comprises at step 350 an application receiving notification of the event being registered by the processing system 100.

At step 360, the method 300 comprises the application initiating an API call to an API procedure so as to carry out a response to the registered event, wherein the response may be the execution of the action 230 in relation to the target entity 220. If an API hook has been established between the API call and the API procedure, the API call is intercepted before it reaches the API procedure at step 370. Processing can be performed by an API hook function once the API call has been intercepted prior to the API procedure being called. The API call may be allowed to continue calling the API procedure at step 380 such that the action 230 is performed in relation to the target entity 220.

Figure 4:
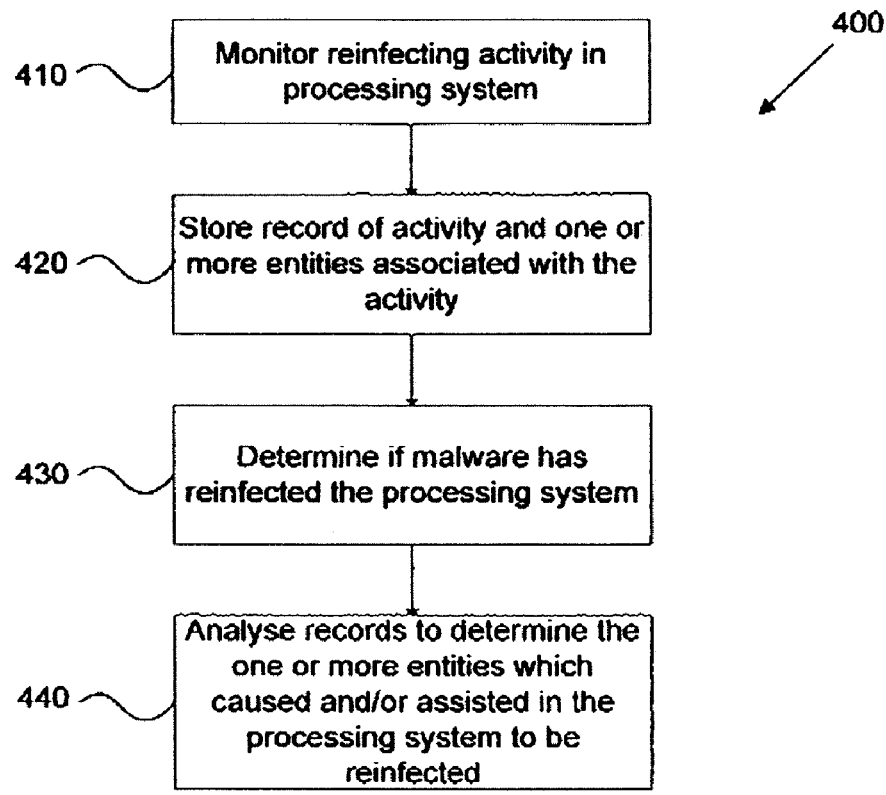
FIG. 4 illustrates a flow diagram of an example method of detecting one or more entities which reinfect the processing system with malicious software.

Referring to FIG. 4, there is shown a flow diagram representing an example method 400 of detecting one or more entities 210, 220 which are able to reinfect a processing system 100 with malicious software. At step 410 the method 400 comprises monitoring, in the processing system 100, activity 230 indicative of the malicious software reinfecting the processing system 100. At step 420, in response to detecting the activity 230, the method 400 comprises storing a record of the activity 230 and one or more entities 210, 220 associated with the activity 230. At step 430, the method 400 comprises determining if the malicious software has reinfected the processing system 100. At step 440, in response to determining that the malicious software has reinfected the processing system 100, the method 400 comprises analysing the record to detect the one or more entities 210, 220 which were associated with the activity 230 that caused and/or assisted in reinfecting the processing system 100 with the malicious software.

A system 1 can be provided which detects the one or more entities 210, 220 which are able to reinfect the processing system 100. In particular, the system 1 is configured to monitor, in the processing system 100, activity 230 indicative of the malicious software reinfecting the processing system 100; in response to detecting the activity 230, store a record of the activity 230 and one or more entities 210, 220 associated with the activity 230; determine if the malicious software has reinfected the processing system 100; and in response to determining that the malicious software has reinfected the processing system 100, analyse the record to detect the one or more entities 210, 220 which were associated with the activity that caused and/or assisted in reinfecting the processing system 100 with the malicious software.

By monitoring and storing activities 230 that are associated with reinfecting the processing system 100 with the malicious software, the one or more entities 210, 220 which cause or facilitate the reinfection can be determined quickly and accurately using the stored records. By detecting the one or more reinfecting entities 210, 220, vendors are able to detect and restrict the reinfecting entities 210, 220 in future applications of the system 1 such that the malicious software is restricted from reinfecting the processing system 100.

Figure 5:
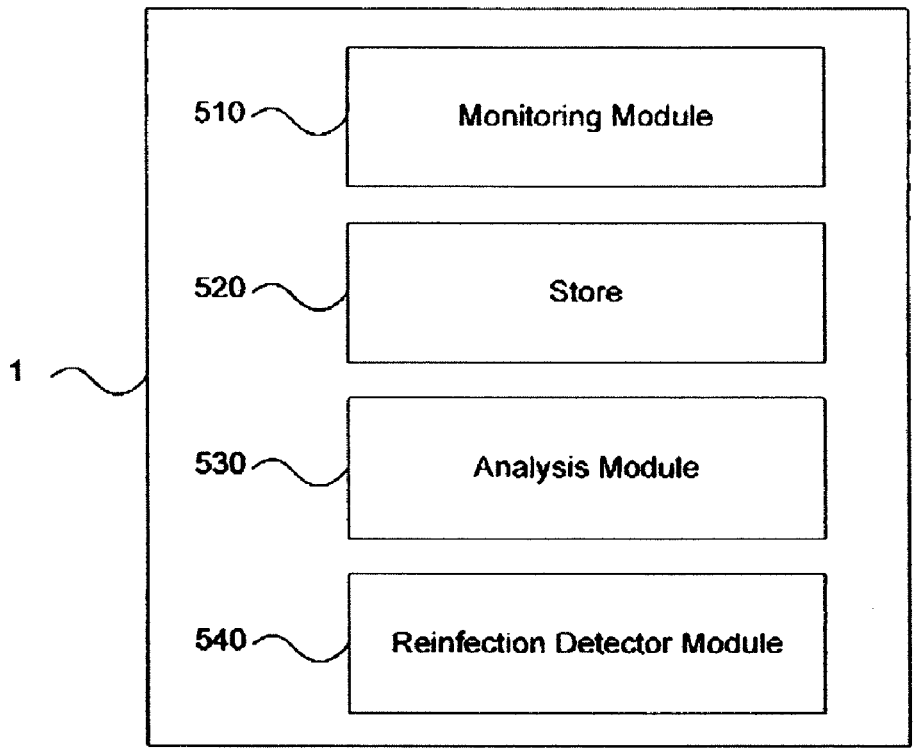
FIG. 5 illustrates a block diagram illustrating an example system to detect one or more entities which reinfect the processing system with malicious software.

Referring to FIG. 5, there is shown a block diagram representing an example of the system 1 to detect the one or more entities 210, 220 which are able to reinfect the processing system 100 with malicious software.

In particular, the system 1 comprises a monitoring module 510 to monitor, in the processing system 100, activity indicative of the malicious software reinfecting the processing system 100. The system 1 also comprises storage module 520 for storing a record of the activity 230 and one or more entities 210, 220 associated with the activity 230. The storage module 520 can be provided in the form of the storage device 114. In one embodiment the storage module 520 can be provided in the form of a database.

The system 1 also comprises an analysis module 530 to determine if the malicious software has reinfected the processing system 100. The system 1 also comprises a reinfection detector module 540 which, in response to detecting that the malicious software has reinfected the processing system 100, analyses the record or records of the storage module 520 to detect the one or more entities 210, 220 which were associated with the activity 230 that caused and/or assisted in reinfecting the processing system 100 with the malicious software.

Figure 6:
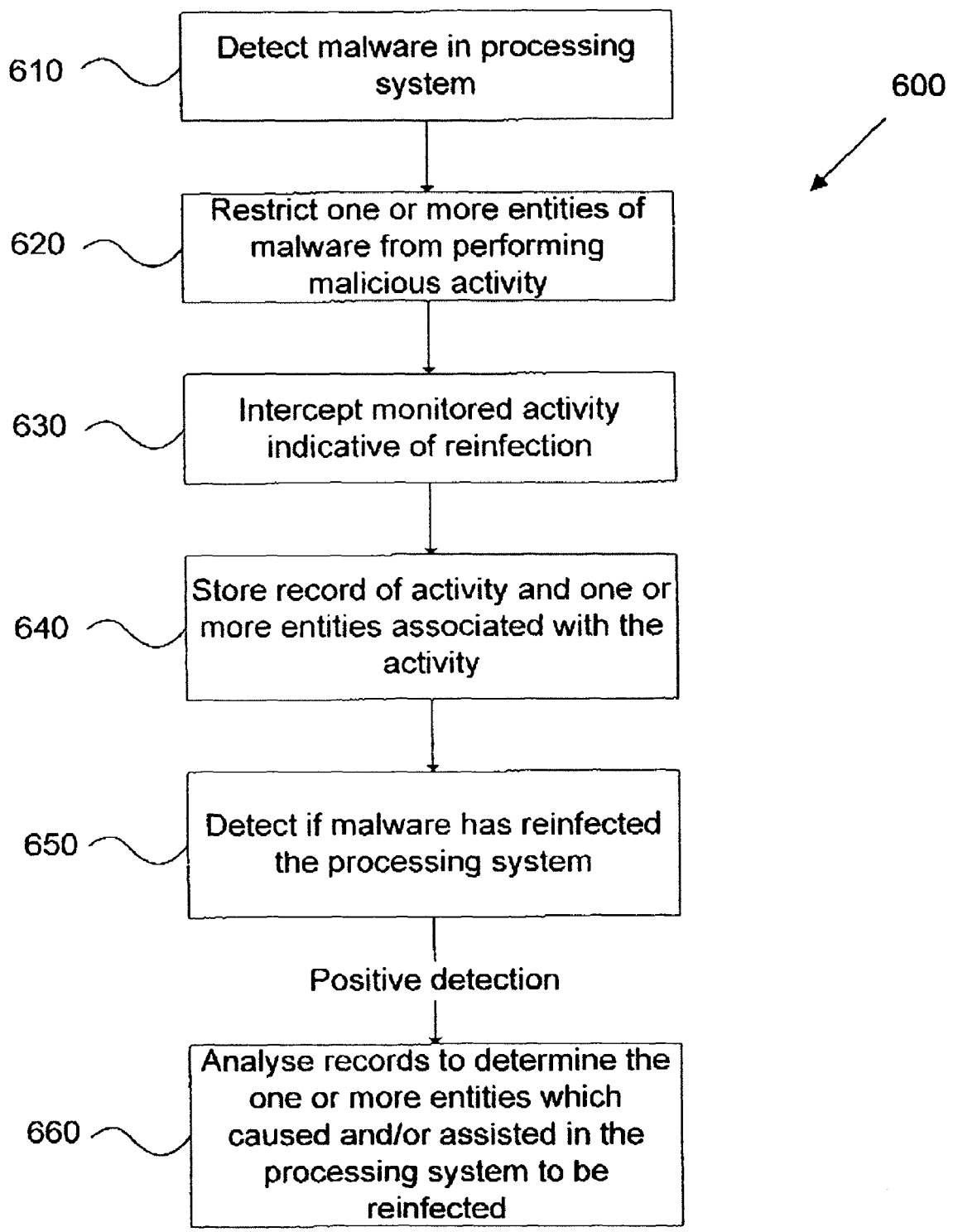
FIG. 6 illustrates a more detailed flow diagram of the method of FIG. 4.

Referring to FIG. 6 there is shown a more detailed flow diagram of an example of the method shown in FIG. 4.

In particular, at step 610, the method 600 comprises detecting malicious software in the processing system 100 using the analysis module 530. The functionality of the analysis module 530 will be described in more detail below. At step 620, the method 600 comprises restricting the detected malicious software from performing malicious activity 230 in the processing system 100. This may comprise removing the malicious software from the processing system 100. Alternatively, this may comprise modifying the malicious software such that the malicious software does not function maliciously.

At step 630, the method 600 comprises intercepting a request to perform a monitored activity 230 indicative of behaviour associated with the processing system 100 being reinfected with the malicious software. The monitoring module 510 can be configured to intercept particular requests to perform activities 230 in the processing system which are associated with the malicious software reinfecting the processing system 100. The monitoring module 510 can be configured to intercept activities as discussed in relation to FIG. 3. For example, the following non-exhaustive list of activities 230 may be monitored by the monitoring module 510: an executable entity creating new executable entities; entities being downloaded from a remote network address (such as the Internet); and entities which create registry entries in the system registry.

At step 640, the method 600 comprises recording the activity 230 and the one or more entities 210, 220 associated with the activity 230 in the storage module 520. A hook function can be used to determine the requesting entity 210 and/or the target entity 220 which are associated with the intercepted activity 230. As previously indicated, the storage module 520 may be in the form of a database, wherein a record of the activity 230, the requesting entity 210 and/or the target entity 220 can be stored. Other information may also be stored in the record such as a time-stamp when the activity 230 occurred in the processing system 100.

At step 650, the method 600 comprises detecting, using the analysis module 530, if the malicious software has reinfected the processing system 100. In response to a positive detection (ie. the malicious software has reinfected the processing system 100), the method 600 proceeds to step 660. In response to a negative detection (ie. the processing system 100 has not been reinfected by the malicious software), the method 600 proceeds back to step 630 by continuing to monitor the activities in the processing system 100.

At step 660, the method 600 comprises using the reinfection detector module 540 to analyse the storage module 520 to determine the one or more entities 210, 220 which are associated with the activity 230 that caused and/or assisted in reinfecting the processing system 100 with the malicious software. The reinfection detector can analyse particular sequences of recorded activity in the storage module 520 to determine the activities associated with the particular reinfection of the malicious software.

Preferably, the malicious software is again restricted in the processing system 100. The method 600 can comprise restricting the one or more entities 210, 220 which cause and/or assist in reinfecting the processing system 100 with the malicious software. This can comprise removing the one or more reinfecting entities 210, 220. Alternatively, the one or more entities 210, 220 may be modified to restrict reinfection of the processing system 100 with the malicious software. In another option, the method 600 can comprise reporting the one or more reinfection entities to a server processing system 720 for review prior to restricting the one or more entities.

Optionally, a user of the processing system 100 can be displayed, using the processing system 100, a list of the one or more entities 210, 220 which cause the reinfection of the processing system 100. In one form, the user is provided the option of indicating whether the one or more entities 210, 220 causing the reinfection should be restricted. In another form, the user can specify that the system 1 automatically restrict the one or more entities 210, 220 causing the reinfection.

In one form, if one of the entities 210, 220 causing the reinfection is a website on the Internet, then the network address of the website can be added to a website blocking list to restrict the malicious software reinfecting the processing system 100.

In one form, as will be apparent from below, the analysis module 530 can use a relationship analysis module 1250 to determine a group of entities which are related to the one or more reinfection entities 210, 220. By using the relationship analysis module 1250, one of the reinfection entities 210, 220 is treated as a starting entity 1300 such as to determine the group of related malicious entities 1330 relative to the reinfection entity 210, 220 in the processing system 100. The group of related malicious entities 1330 can then be restricted in the processing system 100.

Figure 7:
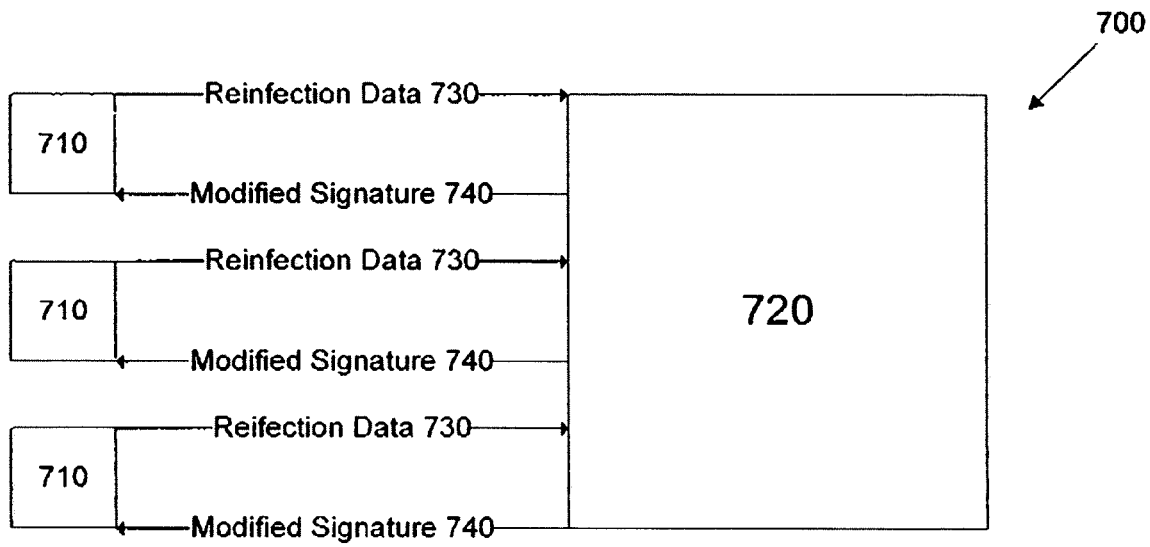
FIG. 7 illustrates a functional block diagram of an example distributed system that can be used to detect one or more entities which reinfect one or more of the client processing systems.

As shown in FIG. 7, the system 1 can be implemented as a distributed system 700 comprising a plurality of client processing systems 710 and one or more server processing systems 720. As shown in FIG. 7, the client processing systems 710 are in data communication with the server processing system 720. On detection of the one or more reinfection entities 210, 220 in one of the client processing systems 710, the respective client processing system 710 generates reinfection data 730 indicative of the one or more reinfection entities 210, 220 and transfers the reinfection data 730 to one of the server processing systems 720. The respective server processing system 720 can modify a signature related to the reinfecting malicious software such as to identify the one or more reinfecting entities 210, 220 in future applications of the signature. The modified signature 740 can be transferred from the server processing system 720 to at least some of the client processing systems 710 which are in data communication. The modified signature 740 can be assessed at the server processing system for false positives prior to distribution to determine if the modified signature is accurate in identifying the malicious software and reinfecting entities 210, 220

Figure 8:
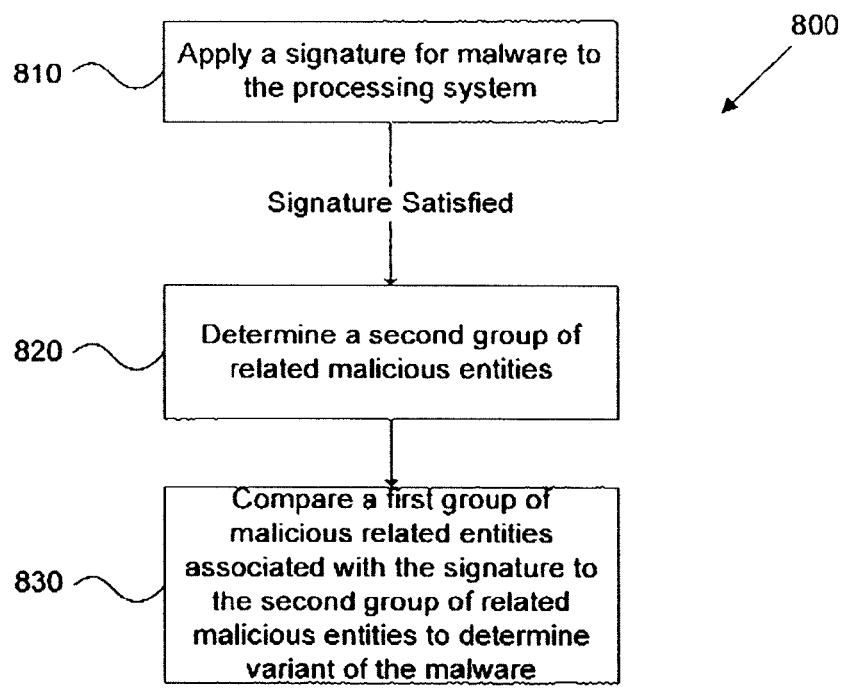
FIG. 8 illustrates a flow diagram illustrating an example method of detecting a variant of malicious software.

Referring to FIG. 8, there is shown a flow diagram representing an example method 800 of detecting a variant of malicious software in a processing system 100. In particular, at step 810 the method 800 comprises applying a signature 913 for the malicious software in the processing system 100, wherein the signature 913 is associated with a first group of related malicious entities 915. At step 820, in response to detecting an entity 210, 220 which satisfies the signature 913, the method 800 comprises determining a second group of related malicious entities 1330 relative to the malicious entity 210, 220. At step 830 the method 800 comprises comparing the first group of related malicious entities 915 to the second group of malicious entities 1330, wherein in response to a partial match, a discrepant portion of the second group of related entities 1330 is detected as the variant of the malicious software. The discrepant portion of the second group of entities is the one or more entities which are not in common with the first group of related entities.

A system 900 can be provided which detects the variant of the malicious software. In particular, the system 900 is configured to apply a signature 913 for the malicious software in the processing system 100, wherein the signature 913 is associated with a first group of related malicious entities 915; in response to detecting an entity 210, 220 which satisfies the signature 913, determine a second group of related malicious entities 1330 relative to the entity 210, 220; and compare the first group of related malicious entities 915 to the second group of related malicious entities 1330, wherein in response to a partial match, a discrepant portion of the second group of related entities 1330 is detected as the variant of the malicious software.

Figure 9:
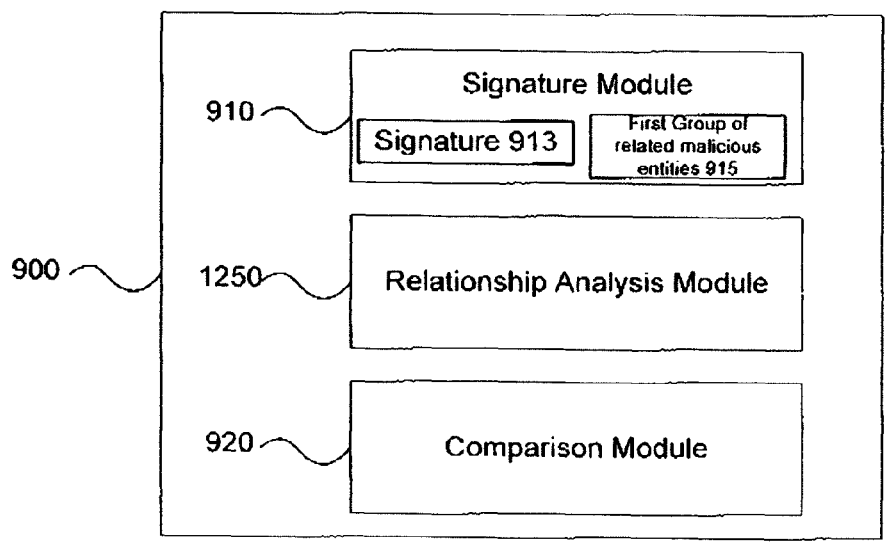
FIG. 9 illustrates a block diagram representing an example system to detect a variant of malicious software.

Referring now to FIG. 9 there is shown a block diagram representing an example system 900 to detect a variant of malicious software. In particular, the system 900 comprises a signature module 910 which is configured to apply a number of signatures 913 for detecting different types and portions of malicious software in the processing system 100. Each signature 913 is associated with a first group of related malicious entities 915 which the respective signature 913 can be used to detect in the processing system 100.

The system 900 also comprises a relationship analysis module 1250. When the signature module detects a malicious entity 210, 220 which satisfies one of the signatures 913, the relationship analysis module 1250 is applied to the processing system 100 to determine a second group of related malicious entities 1330 relative to the malicious entity 210, 220. The system 900 also comprises a comparison module 920 which compares the first group of related entities 915 associated with the satisfied signature 913, with the second group of related entities 1330 relative to the detected malicious entity 210, 220. In the event that there is a partial match between the related entities in the first group of related malicious entities 915 and the second group of related malicious entities 1330, a discrepant portion of the second group of related entities 1330 is detected as being the variant of the malicious software.

Figure 10:
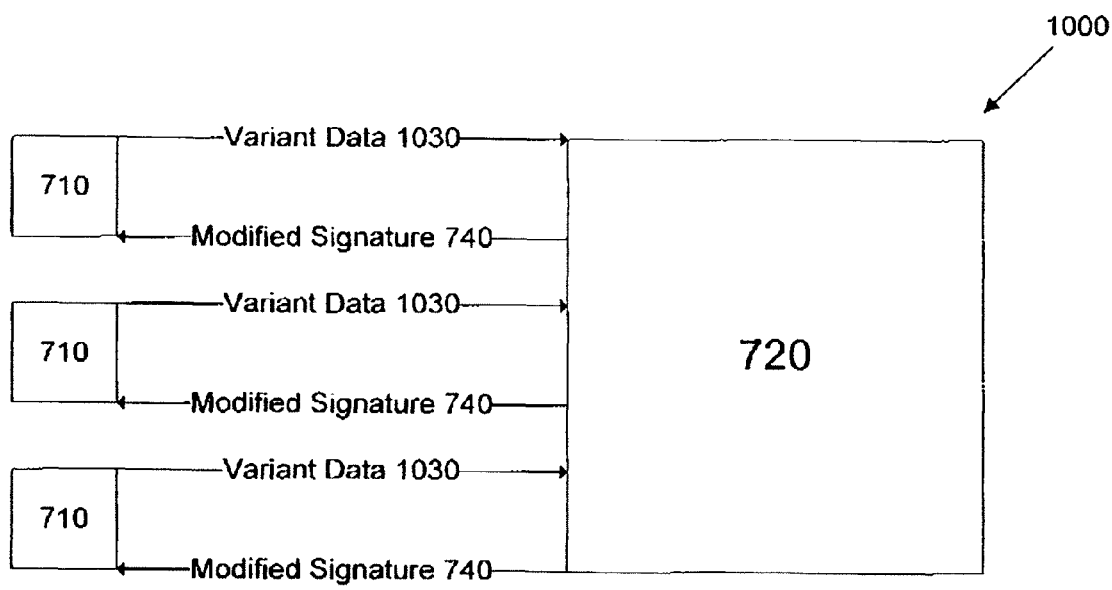
FIG. 10 illustrates a block diagram representing an example distributed system to detect a variant of malicious software.

Referring now to FIG. 10 there is shown a block diagram illustrating another example system 1000 to detect a variant of malicious software. In particular, the system 1000 is a distributed system comprising one or more client processing systems 710 in data communication with one or more of server processing systems 720. As shown in FIG. 10, variant data 1030 indicative of the variant of the malicious software is transferred from one of the client processing systems 710 to one of the server processing systems 720. The server processing system 720 modifies the satisfied signature 915 and distributes the modified signature 740 such that the variant malicious software is detected and restricted in future applications of the modified signature 740.

Figure 11:
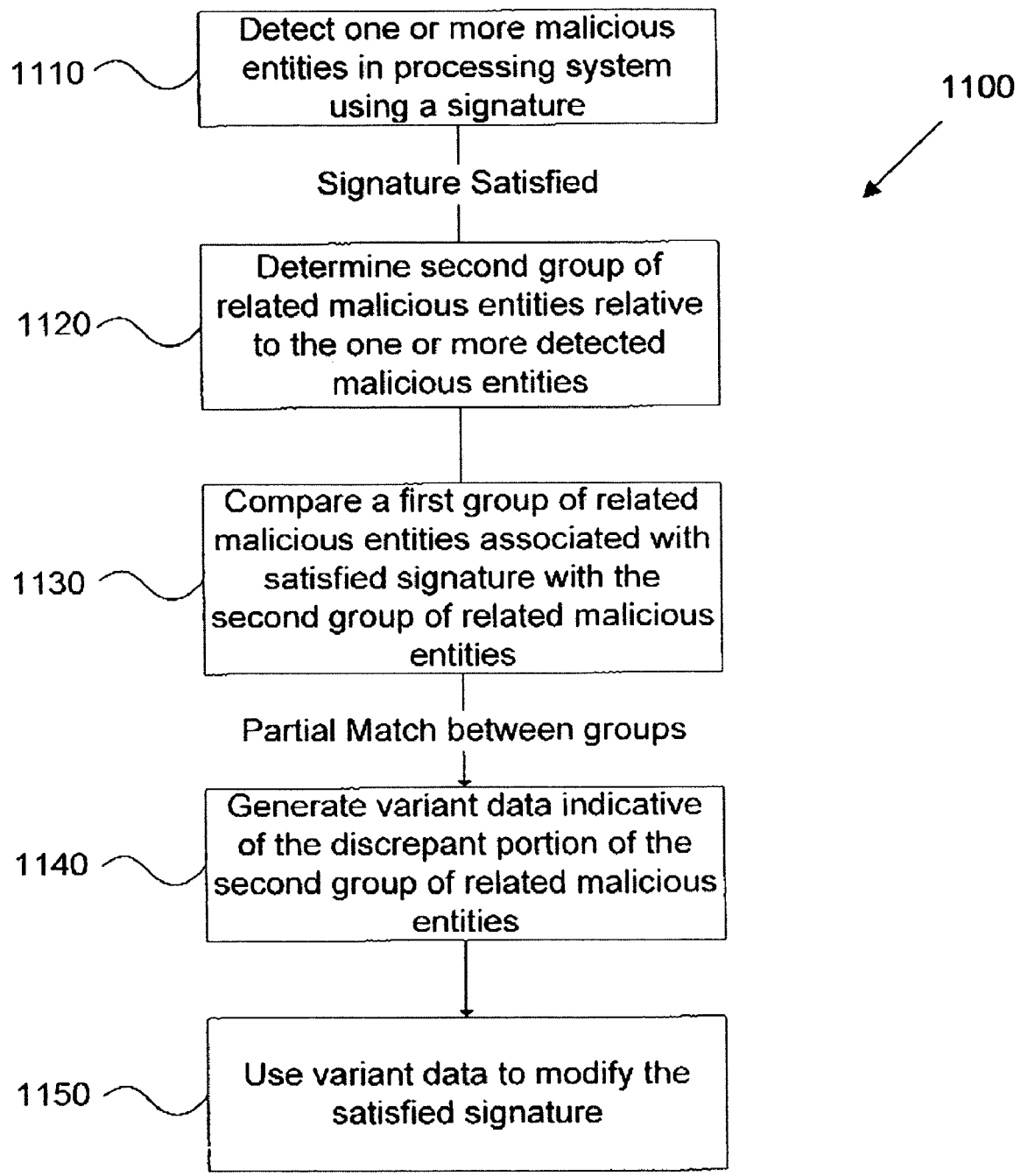
FIG. 11 illustrates a more detailed flow diagram representing the method of FIG. 8.

Referring now to FIG. 11 there is shown a more detailed flow diagram representing the method described with relation to FIG. 8.

In particular, at step 1110, the method 1100 comprises detecting one or more malicious entities 210, 220 in the processing system using one of the signatures 913 of the signature module 910. At step 1120, the method 1100 comprises determining a second group of related malicious entities 1330 for the one or more malicious entities 210, 220 detected in step 1110. This can be performed using the relationship analysis module 1250 to determine the group of related malicious entities 1330, as will be explained in more detail below. This process can also involve determining a group of related suspicious entities 1310, 1320 relative to the malicious entity 210, 220 and using a set of malicious assessment rules to determine the group of related malicious entities 1330 relative to the malicious entity 210, 220. This can be performed in the distributed system 1000, as will be explained in more detail below.

At step 1130, the method 1100 comprises comparing a first group of related malicious entities 915 for the satisfied signature 913 of the signature module 910 to the second group of related malicious entities 1330. In response to a partial match between the first group of related malicious entities 915 and the second group of related malicious entities 1330, a variant of the malicious software has been detected in the discrepant portion of the second group of related malicious entities 1330.

At step 1140, the method 1100 can comprise generating variant data 1030 indicative of the difference between the first group of related entities 915 and the second group of related entities 1330. At step 1150, the method 1100 comprises using the variant data 1030 to modify the signature 913 satisfied at step 1110, such that the modified signature 740 can detect the entities of the variant malicious software in future applications.

In one form, the variant data 1030 may be generated in a client processing system 710 and transferred to a server processing system 720. The variant data 1030 is also indicative of the satisfied signature 913. The server processing system 720 modifies the satisfied signature 913 using the variant data 1030, and distributes to one or more of the client processing systems 710 the updated signature 740 such the entities of the variant malicious software can be detected and restricted. The modified signature 740 can be assessed at the server processing system 720 for false positives to determine if the modified signature is accurate in detecting the variant malicious software prior to distribution to client processing systems 710. Additionally, the data indicative of the discrepant portion of the second group of related malicious entities 1330 can be stored with the modified signature 740.

Optionally, a user of the processing system 100 can be displayed, using the processing system 100, an indication of the detection of the variant of the malicious software. Information can be displayed to the user indicative of the entities which are different between the original version of the malicious software and the new variant. In one form, the user is provided the option of indicating whether the variant should be restricted. In another form, the user can specify that the system 1000 automatically restrict the entities of the variant of the malicious software.

Figure 12:
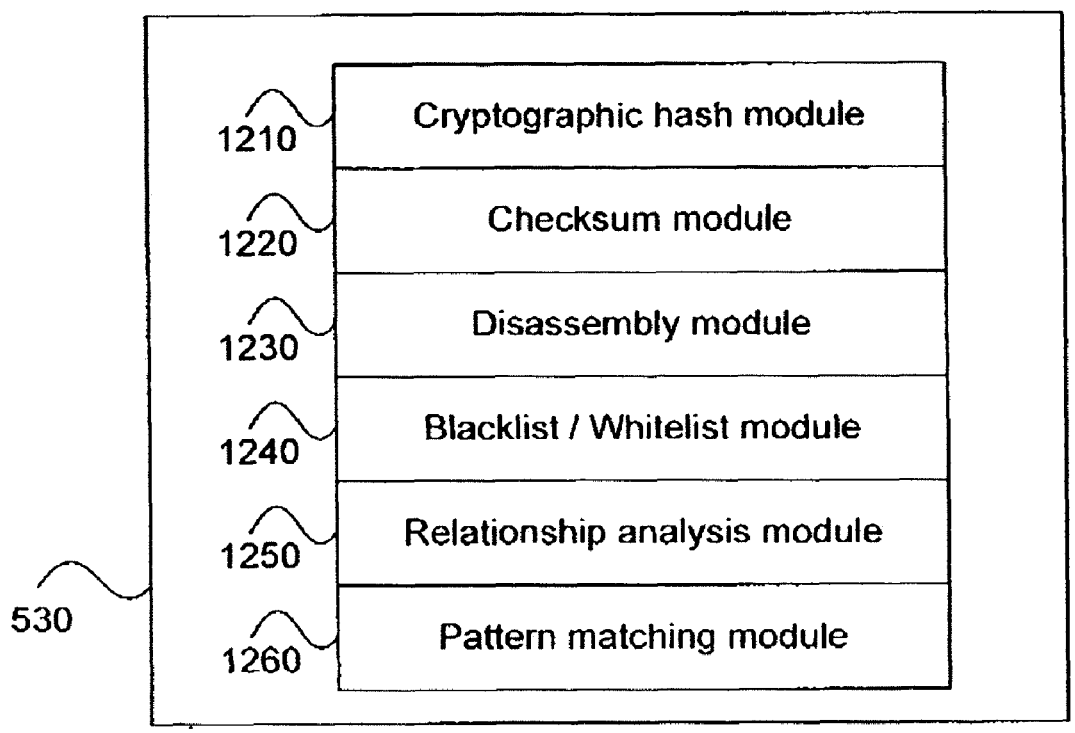
FIG. 12 illustrates a block diagram representing an analysis module.

Referring now to FIG. 12, there is shown the analysis module 530 which can comprise a number of sub-modules to determine if the processing system 100 is performing, or is going to perform, an activity associated with malicious software.

In particular, the analysis module 530 can comprise the sub-modules of a cryptographic hash module 1210, a checksum module 1220, a disassembly module 1230, a black-list/white-list module 1240, a relationship analysis module 1250, and a pattern matching module 1260. The analysis module 530 can be used to determine if the activity 230 associated with one of more entities 210, 220 is related to malicious software.

The analysis module 530 can be configured to use one or more of these sub-modules exclusively or in combination to detect activity 230 associated with malicious software in the processing system 100. The analysis module 530 can be used to analyse at least one of the target entity 220, the requesting entity 210, and the activity 230 to determine if the processing system 100 is compromised with malicious software.

The cryptographic hash module 1210 of the analysis module 530 is configured to generate a cryptographic hash value of an entity. As the cryptographic hash value can be used an identity, the cryptographic hash value can be used in comparisons with the blacklist/whitelist module 1240 to determine whether the entity is malicious.

The checksum module 1220 of the analysis module 530 is configured to determine a checksum of an entity of the processing system 100. The checksum can be compared to a database (blacklist/whitelist module 1240) to determine whether the entity is malicious.

The pattern matching module 1260 of the analysis module 530 is configured to search an entity for particular patterns of strings or instructions which are indicative of malicious activity. The pattern matching module 1260 may operate in combination with the disassembly module 1230 of the analysis module 530.

The disassembly module 1230 is configured to disassemble binary code of an entity such that the disassembly module 1230 determines processing system instructions for the entity. The processing system instructions of the entity can then be used by the pattern matching module 1260 to determine whether entity is malicious. Although strings of instructions can be compared by the pattern matching module 1260, the pattern matching module 1260 may be configured to perform functional comparisons of groups of instructions to determine whether the functionality of the entity is indicative of malicious software.

Figure 13:
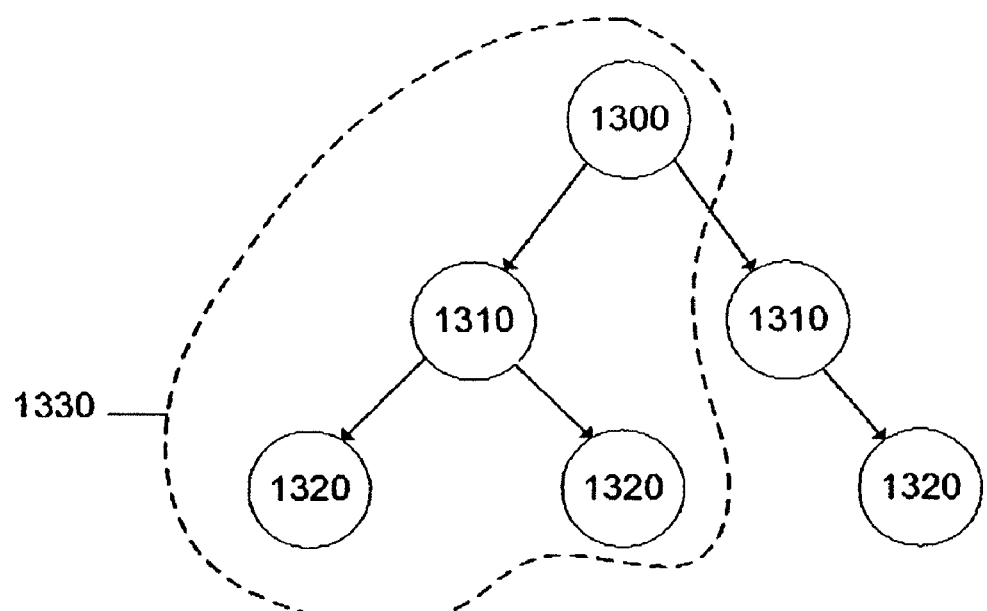
FIG. 13 illustrates a functional block diagram of the operation of a relationship analysis module.

The blacklist/whitelist module 1240 of the analysis module 530 comprises a list of malicious and/or non-malicious entities. The blacklist/whitelist module 1240 may be provided in the form of a table or database which comprises data indicative of malicious and non-malicious entities. The table may comprise checksums and cryptographic hash values for malicious and non-malicious entities. The data stored in the blacklist/whitelist module 1240 can be used to determine whether an entity in the processing system 100 is malicious or non-malicious The relationship analysis module 1250 can be used to detect related entities based on a starting entity 1300. As shown by example in FIG. 13, once a malicious entity 210, 220 has been detected, the malicious entity 210, 220 is treated as the starting entity 1300, and then using the relationship analysis module 1250, a web of entities 1300, 1310, 1320 related to the starting entity 1300 can be determined. At least a portion 1330 of the web of entities 1300, 1310, 1320 is determined to be the group of related malicious entities 1330 A detailed explanation of detecting related one or more related entities is described in the Applicant's co-pending U.S. patent application Ser. No. 11/707,425 and co-pending Australian Patent application AU2007200605 entitled "Determination of related entities", the content of which is herein incorporated by cross-reference.

Generally, malicious software comprises a bundle of entities. By only considering a single entity by itself, it may not be accurately possible to determine all the entities of the malicious software. However, by determining related entities 1310, 1320 relative to the starting entity 1300 representing the malicious entity 210, 220, a more accurate assessment can be made. Furthermore, removing a single malicious entity may not necessarily disable the malicious software from performing some malicious activity. Some particular forms of malicious software can perform repairs in relation to a single malicious entity being removed or disabled. Therefore, detecting a group of related entities can be beneficial for disabling malicious software.

Figure 14:
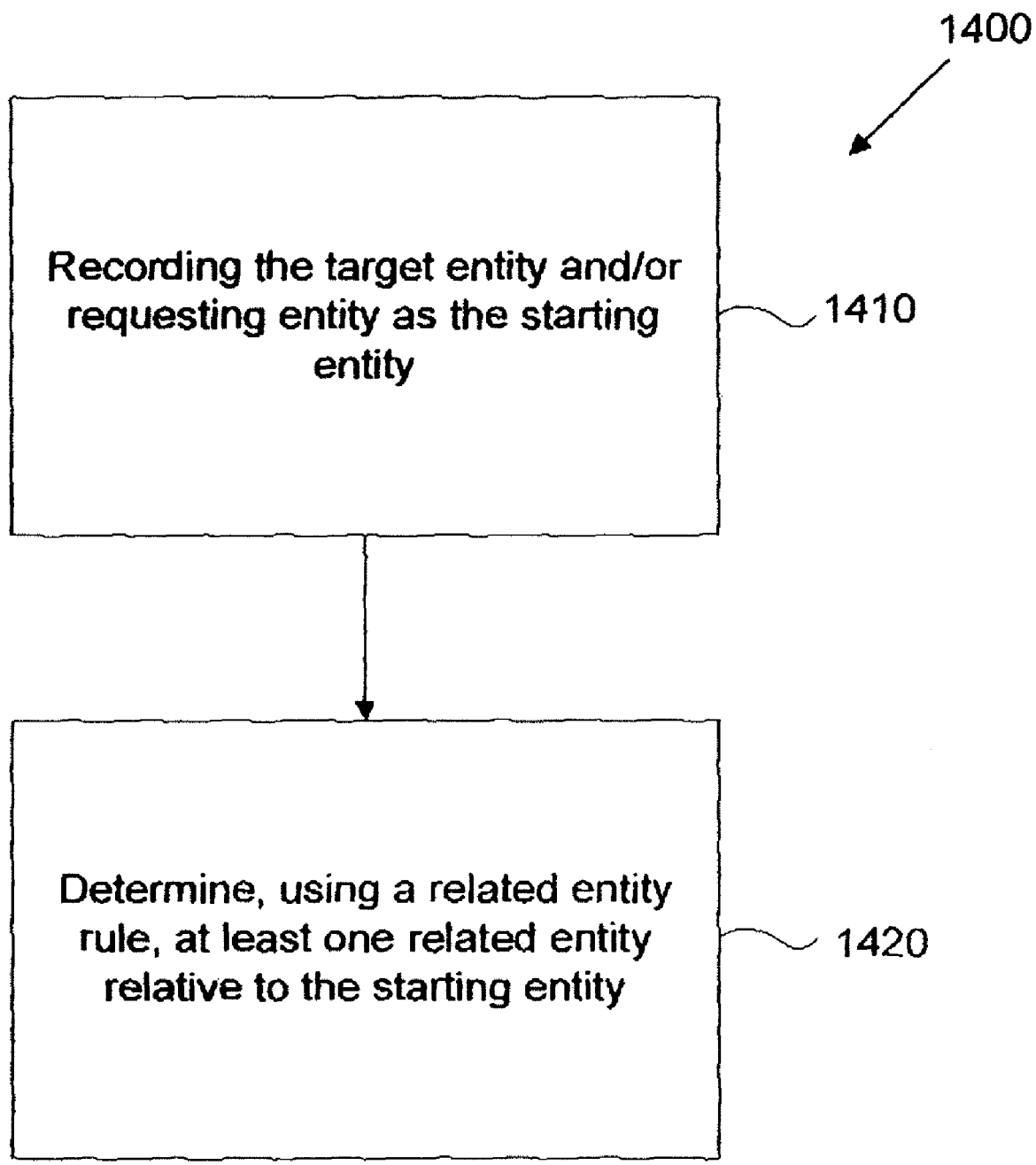
FIG. 14 illustrates a flow diagram representing an example of a method performed by the relationship analysis module.

Referring now to FIG. 14, there is illustrated a flow diagram illustrating an example method 1400 of determining a group of related entities in a processing system 100. The method 1400 represents the operation of the relationship analysis module 1250. The method 1400 can be used to determine a group of related malicious entities.

In particular, at step 1410 the method 1400 comprises recording a malicious entity as the starting entity 1300. At step 1420, the method 1400 comprises determining, using a related entity rule, at least one related entity 1310, 1320 relative to the starting entity 1300.

Figure 15A:
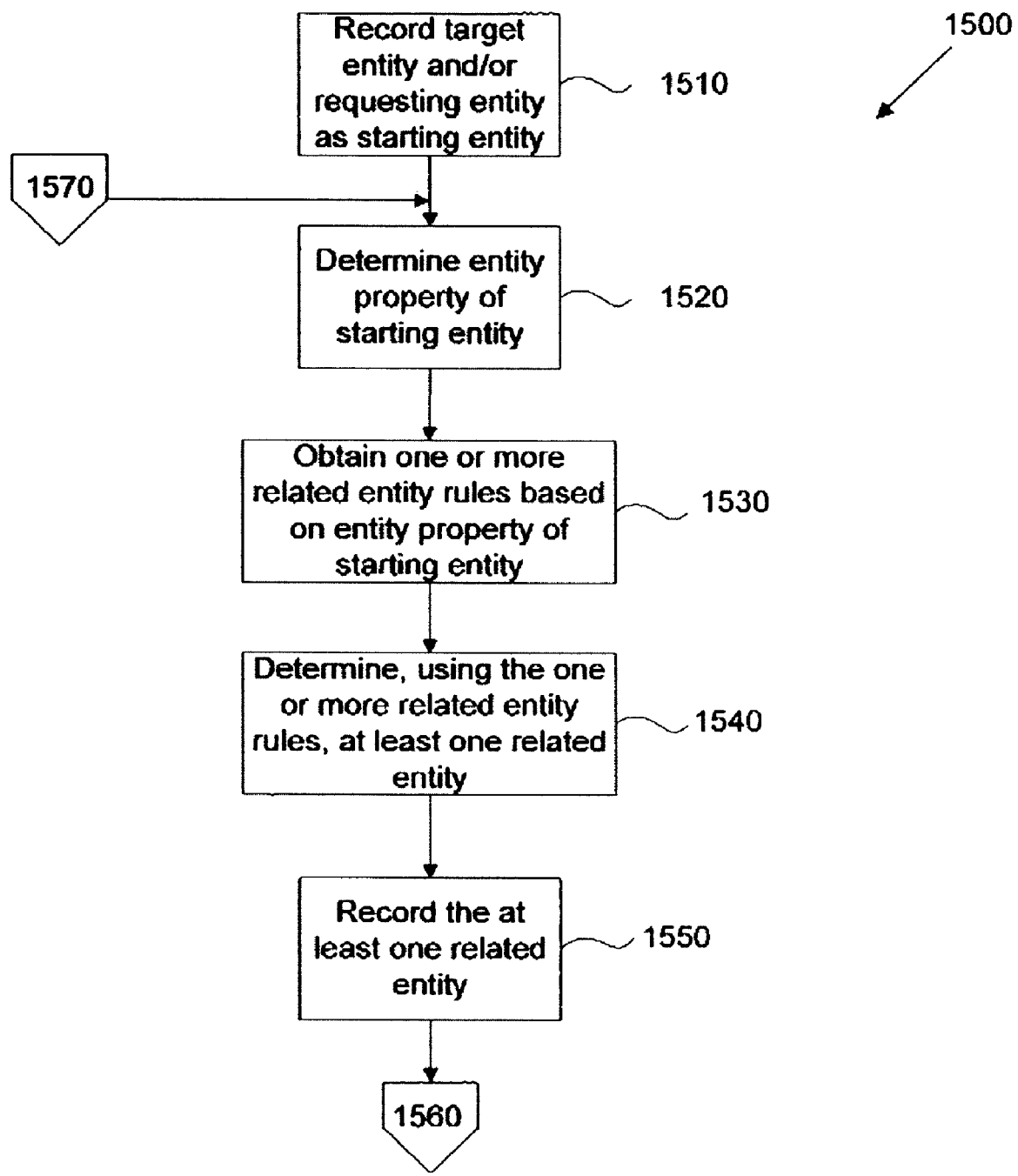
FIGS. 15A and 15B illustrate a more detailed flow diagram of the example method of FIG. 14.
Figure 15B:
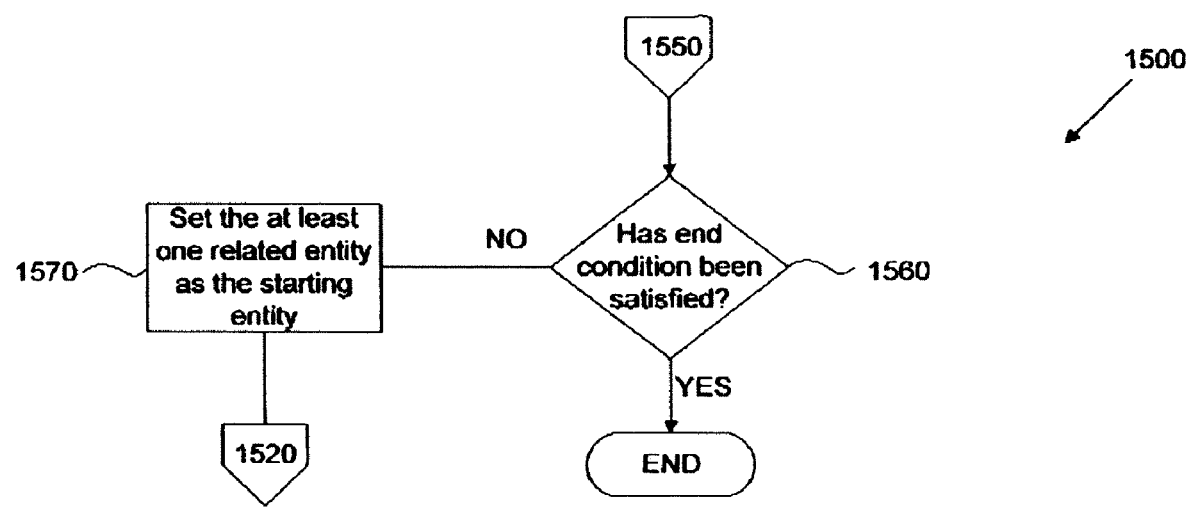

A more detailed example of a method illustrated in FIG. 14 will now be described with reference to FIGS. 15A and 15B, which are directed towards determining a group of related malicious entities.

In particular, at step 1510, the method 1500 comprises recording the malicious entity (which can comprise one of the reinfecting entities) 210, 220 as the starting entity 1300. This can comprise the client processing system 710 recording the starting entity 1300 in the client processing system memory, such as storage device 114. The starting entity 1300 may be stored in the form of a table or list.

At step 1520, the method 1500 comprises determining an entity property associated with the starting entity 1300. The entity property may be an entity type of the entity, such as whether the starting entity is an executable entity, a run key entity or a dynamic linked library entity. The entity property may also be a time that the entity was created or modified. The entity property may comprise the directory which the entity is contained within. The entity property may also be a vendor name associated with the entity. The entity property may also be a particular network address from which the entity was downloaded.

It will be appreciated that more than one entity property may be determined for the starting entity 1300. However, for the purposes of simplicity for this example, it will be assumed that one entity property has been determined for the starting entity 1300.

At step 1530, the method 1500 comprises obtaining, based on the entity property of the starting entity 1300, one or more related entity rules. In this particular example, the one or more related entity rules take the form of one or more rules for determining suspicious entities related to the starting entity 1300. Step 1530 may comprise selecting, based on the entity property, the one or more related entity rules from a larger set of related entity rules. Each related entity rule is associated with a particular entity property, and as such, a selection of a related entity rules can be performed based on the entity property of the starting entity 1300. An example list of entity properties and corresponding related entity rules is shown below in List 1.

(i) if the starting entity comprises a vendor name, the at least one suspicious related entity is one or more entities comprising the same vendor name;
(ii) if the starting entity comprises a product name, the at least one suspicious related entity is one or more entities comprising the same product name;
(iii) if the starting entity comprises a version name, the at least one suspicious related entity is one or more entities comprising the same version name;
(iv) if the starting entity was created at a particular time in the one or more processing systems, the at least one suspicious related entity is one or more entities which were created at a similar time to that of the starting entity;
(v) if the starting entity accesses a particular network address or network address range or network address names, the at least one suspicious related entity is one or more entities which also access the same particular network address or network address range or network address names.
(vi) if the starting entity accesses a particular network address or network address range, the at least one suspicious related entity is the particular network address or network address range or network address names.
(vii) if the starting entity causes another process to execute, the at least one suspicious related entity is one or more entities which was executed by it.
(viii) if the starting entity was executed by a process, the at least one suspicious related entity is one or more entities which executed the starting entity.
(ix) if the starting entity creates or modifies an entity, the at least one suspicious related entity is one or more entities which it creates or modifies.
(x) if the starting entity is found in a directory not in a list of whitelist directories, the at least one suspicious related entity is one or more entities which also exist in the same directory.
(xi) if the starting entity is downloaded from the internet/tcpip, the at least one suspicious related entity is one or more entities which were downloaded at the same time or by the same process or from the same particular network address or network address range or network address names.

List 1: Example of Entity Properties and Corresponding Related Entity Rules

It will be appreciated that a more detailed list of entity properties and corresponding related entity rules can be obtained using the above general rules. An example of a more detailed list of entity properties and corresponding related entity rules are provided below.

TABLE 1

Further example of Entity Properties and corresponding related entity rules

| Entity Property | Related Entity Rule |
| --- | --- |
| trigger entity | The one or more suspicious related entities are triggerable entities which are triggerable by the run-key entity |
| executable entity | The one or more suspicious related entities are one or more files in an INF file associated with the starting entity |
| executable entity | The one or more suspicious related entities are one or more trigger entities which trigger the starting entity |
| executable entity | The one or more suspicious related entities are one or more favourites which trigger the starting entity |
| executable entity | The one or more suspicious related entities are one or more items of embedded executable content inside the starting entity |
| executable entity | The one or more suspicious related entities are one or more instances of windows created by the executable entity |
| executable entity | The one or more suspicious related entities are one or more desktop link files (short cuts) which trigger the executable entity |
| executable entity | The one or more suspicious related entities are one or more modules loaded by the starting entity |
| executable entity | The one or more suspicious related entities are one or more classids or guids assocaiated with the starting entity |
| executable entity | The one or more suspicious related entities are one or more network addresses or network address ranges or network address names associated with the starting entity |
| classid/guid entity | The one or more suspicious related entities are one or more BHO or TOOLBAR names associated with the classid/guid |
| classid/guid entity | The one or more suspicious related entities are one or more one or more class names associated with the classid/guid |
| classid/guid entity | The one or more suspicious related entities are one or more network addresses or network address ranges or network address names associated with the starting entity |
| classid/guid entity | The one or more suspicious related entities are one or more executable entities related to the classid/guid |
| module entity | The one or more suspicious related entities are one or more executable entities that are loaded by the module entity |
| network address/network address range/network address name | The one or more suspicious related entities are one or more files associated with the network address or network address range or network address name |
| network address/network address range/network address name | The one or more suspicious related entities are one or more links or short cuts associated with the network address or network address range or network address name |
| network address/network address range/network address name | The one or more suspicious related entities are one or more classids associated with the starting entity |

TABLE 1-continued

Further example of Entity Properties and corresponding related entity rules

| Entity Property | Related Entity Rule |
|---|---|
| network address/network address range/network address name | The one or more suspicious related entities are one or more favourites associated to the starting entity |
| network address/network address range/network address name | The one or more suspicious related entities are one or more executable entities related to the starting entity |
| network address/network address range/network address name | The one or more suspicious related entities are one or more start pages related to the starting entity |
| network address/network address range/network address name | The one or more suspicious related entities are one or more cookies related to the starting entity |
| BHO Tool Bar entity | The one or more suspicious related entities are one or more classids associated with the starting entity |
| BHO Tool Bar entity | The one or more suspicious related entities are one or more names associated with the starting entity |
| BHO Tool Bar entity | The one or more suspicious related entities are one or more executable entities executed by the starting entity |
| Favourites entity | The one or more suspicious related entities are one or more network addresses or network address ranges or network address names |
| Favourites entity | The one or more suspicious related entities are one or more executable entities executed by the starting entity |
| Links entity | The one or more suspicious related entities are one or more network addresses or network address ranges or network address names |
| Links entity | The one or more suspicious related entities are one ore more executable entities executed by the starting entity |
| Cookie entity | The one or more suspicious related entities are one or more network addresses or network address ranges or network address names associated with the starting entity |
| windows instance entity | The one or more suspicious related entities are one ore more executable entities that create the starting entity |
| Directory (not in a whitelist) entity | The one or more suspicious related entities are one or more entities that exist in that same directory. |
| INF entity | The one or more suspicious related entities are one or more entities referenced in the starting entity |
| Archive entity | The one or more suspicious related entities are one ore more entities within the archive entity |
| Archive entity | The one or more suspicious related entities are one or more entities in the same directory as the archive entity which fail to appear in a whitelist |
| vendor name of entity | The one or more suspicious related entities are one or more entities which share the same vendor name as the starting entity |
| product name entity | The one or more suspicious related entities are one or more entities which share the same product name as the starting entity |
| version name | The one or more suspicious related entities are one or more entities which share the same version name as the starting entity |
| Creation/Modification time of entity | The one or more suspicious related entities are one or more entities which a similar creation/modification time |

It will be appreciated that a starting entity 1300 having a trigger entity property could be any one of the following entities: run keys, Appinit, Uninstall Key, Service, Hooks, protocol filter, and a startup list. It will further be appreciated that a starting entity having an executable entity property could be any one of the following entities: executables, dynamic linked libraries, and other modules.

It will be appreciated from List 1 that the general entity properties and related entity rules can be extended to specific entity types, such as the entity types shown in Table 1, for example INF entities, Cookies entity, windows instance entity and the like shown above. The more specific rules in Table 1 allow for a more specific selection of rules based on the more specific entity property, which can therefore result in accurately determining the relevant related entity rules.

It will also be appreciated from Table 1 that more than one related entity rule can be obtained based on the one or more entity properties of the starting entity 1300. As shown above in Table 1, if the entity property indicates that the starting entity 1300 is an executable entity, then nine separate types of related entity rules can be applicable for determining the suspicious related entities relative to the starting entity 1300.

Additionally or alternatively, the client processing system 710 may transfer, to a server processing system 720, the entity property of the starting entity 1300, and receive, from the server processing system 720, the one or more related entity rules. In this step, the server processing system 720 may select the one or more related entity rules using the entity property from a server set of related entity rules, and then transfer the one or more related entity rules to the client processing system 710.

At step 1540, the method 1500 comprises determining, using the one or more related entity rules, the at least one related entity. In this particular example the related entity rules determine related suspicious entities in relation to the starting entity 1300. For simplicity purposes, the following example is presented using one related entity rule, however) it will be appreciated that more than one related entity rule can be used. In this example the starting entity 1300 may be "Spywarz.exe" which comprises a vendor name of "Spywarz Software Enterprises". The entity property of the vendor name is used to obtain a related entity rule such as:

"The one or more relored entities have a vendor name equalling 'Spywarz Software Enterprises".

This related entity rule is then used to determine any entities in the client processing system 710 which satisfy this rule. When a scan has been performed using the related entity rule, it was determined that "Spywarz.dll" comprises a vendor name of 'Spywarz Software Enterprises'. As the related entity rule has been satisfied, 'Spywarz.dll' is considered a related entity 1310 to the starting entity 1300 'Spywarz.exe' As such, a group of related suspicious entities has been determined which comprises 'Spywarz.exe' and 'Spywarz.dll'.

Optionally, weighted values may be associated with the related entity rules.

Steps 1510 to 1540 represent a single iteration to determine a group of related suspicious entities. However, if a more detailed group of related entities 1310, 1320 is required, it is possible to perform multiple iterations of steps 1510 to 1540, as will now be discussed At step 1550, the at least one related entity 1310 is recorded. This may involve adding the at least one related entity 1310 to the list or a table which comprises the starting entity 1300 recorded at step 1510. Furthermore, the list or table may comprise data indicative of the relationship between the at least one related entity 1310 and other entities which have been previously recorded.

At step 1560, the method 1500 comprises determining if an end condition has been met. For example, the end condition may be satisfied when no other related entities 1310, 1320 are determined; when no new related entities are determined; when no other related entities 1310, 1320 are determined in a period of time; when the starting entity has an entity type which is indicative of the end condition; and/or when a selected number of repetitions have been performed. If the end condition has not been met, the method continues to step 1570.

At step 1570, the method 1500 comprises setting the at least one related entity 1310 as the starting entity 1300. This may be performed in memory by reassigning the value of the starting entity 1300. By setting the at least one related entity 1310 as the starting entity 1300, steps 1520 to 1560 can be repeated until the end condition is met. Upon completion of step 1570, the method returns to step 1520, thereby determining the related entities 1310, 1320 for the newly set starting entity 1300. As such, a web or network of related entities 1300, 1310, 1320 is determined until the end condition is met.

Once the end condition is satisfied, the determination of the group of related entities 1300, 1310, 1320 has been completed, and thus the other sub-modules 1210, 1220, 1230, 1240, 1260 of the analysis module 1200, and/or a server-side analysis module, can be used to determine whether the group of related entities 1300, 1310, 1320, or at least some of the related entities 1330, are associated with malicious activity.

Figure 16:
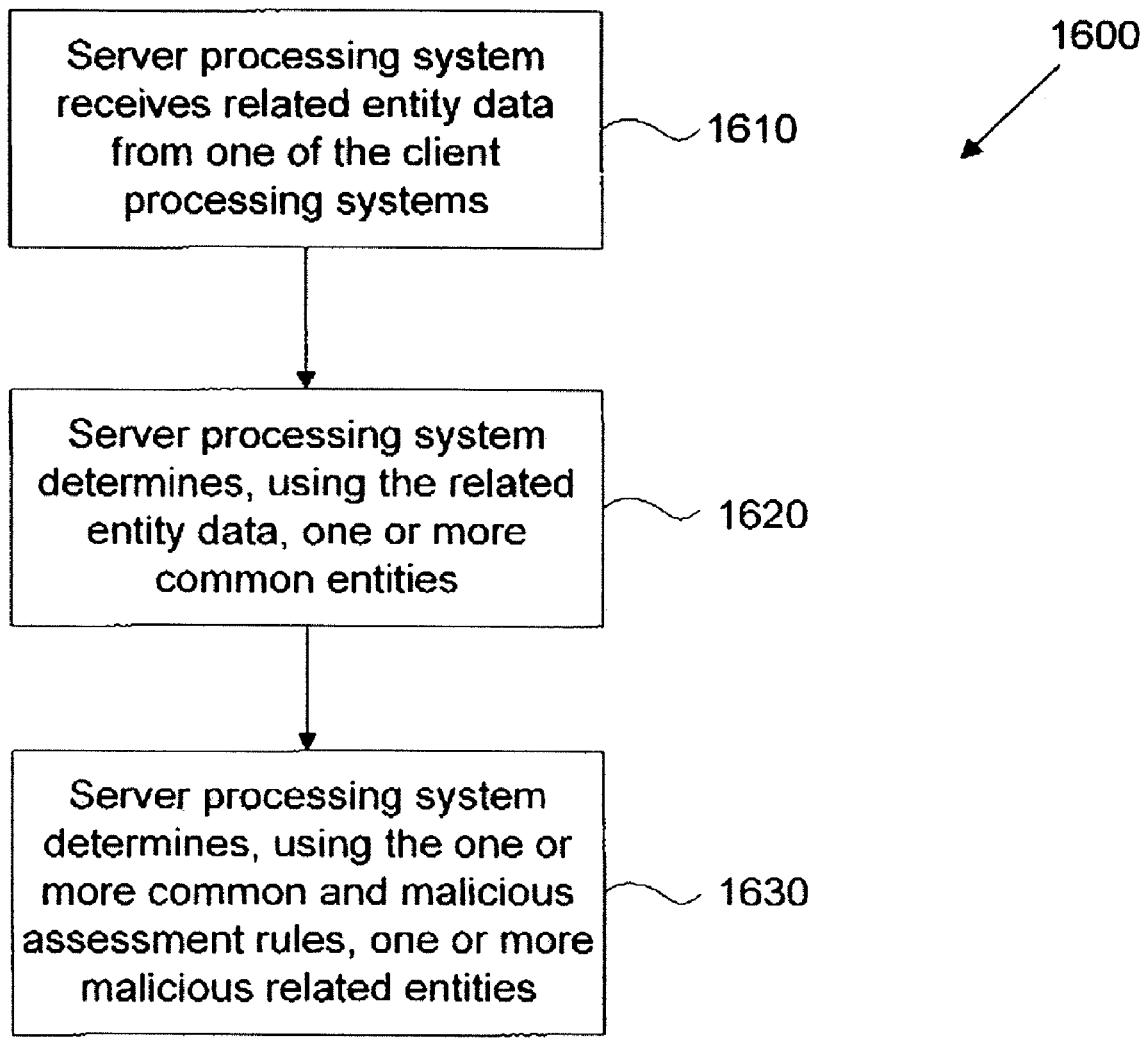
FIG. 16 illustrates a flow diagram of an example method of using a server processing system to detect malicious activity.

An example method of determining entities which are associated with malicious activity using a server-side analysis module will now be described with reference to FIG. 16.

At step 1610 the method 1600 comprises receiving, in the server processing system 720, related entity data indicative of the group of related entities 1330 from the client processing system 710. The related entity data may comprise measurements and or properties associated with each related entity in the group 1300, 1310, 1320. Additionally or alternatively, the related entity data may be the actual entities detected in the client processing system 710. The server processing system 720 may also receive a suspicion identifier indicative of a suspected behaviour associated with the suspicious entities. For example, the suspicion identifier may be indicative of the suspicious entities being associated with a pop-up window being displayed on the client processing system 710 at regular intervals. The related entity data may also comprise data indicating the starting entity 1300 in the group 1300, 1310, 1320.

At step 1620, the server processing system 720 determines, using the related entity data, one or more common entities in relation to records from other client processing systems 710. This step comprises determining if the related entity data received from one of the client processing systems 710 comprises one or more entities in common with other records of related entity data received from other client processing systems 710. If suspicion identifiers were received from the other client processing systems 710 in relation to the related entity data, the server processing system 720 may use the suspicion identifier to determine the common entities. By determining the common entities, the group of entities which may be malicious can be reduced. Furthermore, this step provides an additional filter by reducing the number of false positives that need to be analysed.

At step 1630, the method 1600 comprises the server processing system 720 determining, using the one or more common entities and the server-side analysis module, one or more entities associated with malicious activity. The server-side analysis module can comprise one or more of the sub-modules of the client processing system analysis module 530. Furthermore, the server-side analysis module can comprise a set of malicious assessment rules.

The malicious assessment rules can be used to determine a level of maliciousness for the common related entities. If the level of maliciousness is determined to be more than a maximum limit, then at least some of the common related entities are identified as being associated with malicious activity.

In one form, if a common entity satisfies a particular malicious assessment rule, the common entity is associated with a value or weight indicating how malicious the entity is considered. If the same common entity satisfies a number of particular malicious assessment rules, the values or weights associated with the entity are totalled. The total value or weight can be compared to a maximum limit to determine whether the common related entity is associated with malicious activity.

The malicious assessment rules are generally considered to be a stricter set of rules in order to filter the common related entities. As the malicious assessment rules are generally more complex and considered more complete than the related entity rules, a number of the entities which were considered suspicious may not necessarily satisfy the malicious assessment rules and are therefore not identified as being associated with malicious activity. For example, a legitimate printer driver may have been identified as related to an entity of interest and was also identified as a common entity due to a particular type of malicious software using the printer driver to perform malicious activities. However, after the malicious assessment rules have been applied, the printer driver is determined to not be part of the malicious activity. The remaining common entities which satisfy the malicious assessment rules are identified as the group of related malicious entities 1330. In some instances, data indicative of the group of malicious entities 1330 can be transferred back to the relevant client processing system 710 such that at least one of the variant of the malicious software can be determined, and the one or more reinfecting entities 210, 220 can be detected.

In regard to detecting a group of related malicious entities using the reinfecting entity 210, 220 as the starting entity 1300, the client processing system 710 determines a group of related suspicious entities 1300, 1310, 1320 relative to the starting entity 1300 and transfers data 730 indicative of the group of related suspicious entities 1300, 1310, 1320 to the server processing system 720. The server processing system 720 then determines, using method 1600 outlined in FIG. 16, the group of related malicious entities 1330 based on the group of related suspicious entities 1300, 1310, 1320. The server processing system 720 then modifies the relevant signature for the reinfecting malicious software based on the identified group of related malicious entities and transfers the modified signature 740 to at least some of the client processing systems 710 in the distributed system 700.

In regard to detecting a variant of the malicious software using a detected malicious entity 210, 220 as a starting entity 1300, one of the client processing systems 710 determines a group of related suspicious entities 1300, 1310, 1320 relative to the starting entity 1300. The client processing system 710 then transfers data indicative of the group of related suspicious entities 1300, 1310, 1320 to the server processing system 720. The server processing system then applies the method 1600 described with reference to FIG. 16 to determine the group of related malicious entities 1330. In some forms, data indicative of the group of related malicious entities 1330 can be transferred back to the client processing system 710 such that the comparison module 920 can determine the variant of the malicious software. However, in other embodiments, the server processing system 720 can perform the comparison between the first group of related malicious entities 915 and the second group of related malicious entities 1330 to determine the variant of the malicious software.

In optional forms, the server processing system 720 may transfer to at least one of the client processing systems 710 instructions to restrict the malicious activity. In one form, this may comprise quarantining the identified entities 1330 associated with the malicious activity in one of the client processing systems 710. The instructions may be computer executable instructions which can be transferred from the server processing system 720 to one of the client processing systems 710 which can be executed to quarantine the one or more entities 1330 identified as being associated with malicious activity. In one embodiment, quarantining the one or more entities 1330 identified as being associated with the malicious activity may comprise removing the one or more identified entities 1330 from the client processing system 710. In another embodiment, quarantining the one or more identified entities may comprise modifying the one or more entities 1330 in the one or more client processing systems.

Optionally, the one or more client processing systems 710 may receive, one or more updated related entity rules. The one or more client processing systems 710 may receive updated rules from the server processing system 720 or via a storage device 114 such as a compact disk or the like. The one or more client processing systems 710 can then update the existing rules with the updated rules.

In one form, statistical processes, fuzzy logic processes and/or heuristical processes can be used in combination with related entity rules and/or malicious assessment rules to determine whether a rule has been satisfied.

Optionally, the related entities 1300, 1310, 1320 can be presented to a user of one of the client processing systems 710. The group of related entities 1300, 1310, 1320 may be presented in a tabular form or may be presented in a graphical representation. Additionally, the group of related entities 1300, 1310, 1320 may presented indicating direct or indirect links between entities in the group 1300, 1310, 1320. For example, 'Spywarz.exe' and 'Spywarz.dll' for the above example would have a direct link. However, if a subsequent related entity to 'Spywarz.dll' was determined to be a system variable 'SPYWARZ_VARIABLE', then there would be an indirect link between 'Spywarz.exe' and 'SPYWARZ_VARIABLE'.

It will be appreciated that although in some of the above examples the server processing system 720 generates the instructions to quarantine the entities 1330 associated with the malicious activity, the one or more client processing systems 710 may alternatively generate the instructions.

Additionally or alternatively, different weighting values may be assigned to different malicious assessment rules. The weighting values may be summed or used in a calculation, and if the result is above a maximum limit, then at least some of the group 1330 is determined to be associated with malicious activity.

It is noted that an activity 230 or an entity 210, 220 which is identified as being suspicious is not always identified as being associated with malicious activity.

The related entity rules are generally less complex (such as a reduced number of rules) compared to the malicious assessment rules in order to reduce the processing performed by the client processing systems 710. The malicious assessment rules can be used by the server processing system 720 to determine which related entities 1300, 1310, 1320 are associated with malicious activity. By using this configuration, the server processing system 720 preferably performs the processing related to determining the entities 1330 associated with the malicious activity, and thus the client processing systems 710 can utilise the processing system resources more effectively.

The embodiments discussed may be implemented separately or in any combination as a software package or component. Such software can then be used to pro-actively notify, restrict, and/or prevent malicious activity being performed. Various embodiments can be implemented for use with the Microsoft Windows operating system or any other modem operating system.

Modules and sub-modules may be implemented using hardware, software, or a combination of both.

It will be appreciated that the term "malware" can been used in an abbreviated sense for malicious software which comprises many types of processing system threats such as pestware, spyware and other forms of threats as discussed above.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although a preferred embodiment has been described in detail, it should be understood that various changes, substitutions, and alterations can be made by one of ordinary skill in the art without departing from the scope of the present invention.

The claims defining the invention are as follow:

1. A method of dynamically detecting a variant of malicious software in a processing system, wherein the method comprises:
   applying, by a processor of the processing system, a signature for the malicious software in the processing system, wherein the signature is associated with a first group of related malicious entities;
   receiving at least one related entity rule from a server processing system, wherein the at least one entity rule is based on a property of at least on entity within the first group of related malicious entities;
   in response to detecting, by the processor, an entity of the first group of related malicious entities which satisfies the signature, determining a second group of related malicious entities that satisfy the at least one related entity rule, wherein the second group of related malicious entities is related to the detected entity of the first group of related malicious entities which satisfies the signature for the malicious software;
   comparing, by the processor, entities included in the first group of related malicious entities to entities included in the second group of malicious entities, wherein in response to a partial match, a discrepant portion of the second group of related malicious entities is detected as the variant of the malicious software, wherein the discrepant portion comprises one or more non-matching entities included in the second group of related malicious entities that do not match the one or more entities included in the first group of related malicious entities; and
   generating, by the processor, variant data indicative of the difference between the first group of related malicious entities and the second group of related malicious entities;
   transferring, by the processor, the variant data to the server processing system, wherein the server dynamically generates a modified signature based on the variant data;
   receiving, by the processor, the modified signature from the server processing system based on the variant data, wherein the modified signature identifies the one or more non-matching entities included in the second group of related malicious entities.

2. The method according to claim 1, wherein determining the second group of related malicious entities comprises:
   (a) setting the entity which satisfied the signature as a base entity;
   (b) determining an entity property of the base entity;
   (c) determining one or more related entities to the base entity which are related by the entity property; and
   (d) performing an analysis of the related entities to determine if one or more of the related entities caused and/or assisted in infecting the processing system with the malicious software at a second time period, wherein the second time period is subsequent to the first time period.

3. The method according to claim 2, wherein the method comprises:
   setting the one or more related entities as the base entity; and
   repeating steps (b) and (c), followed by step (d) until an end condition is satisfied.

4. The method according to claim 3, wherein the end condition is at least one of:
   when no related entities are determined in a particular repetition;
   when no new related entities are determined in a particular repetition;
   when no related entities are determined in a period of time;
   when the base entity has an entity property which is indicative of the end condition; and
   when a selected number of repetitions have been performed.

5. A system to detect a variant of malicious software in a processing system, the system comprising:
   a processor;
   memory in electronic communication with the processor; and
   instructions stored in the memory, the instructions being executable by the processor to:
      apply a signature for the malicious software in the processing system, wherein the signature is associated with a first group of related malicious entities;
      receive at least one related entity rule from a server processing system, wherein the at least one entity rule is based on a property of at least on entity within the first group of related entities;
      in response to detecting an entity which satisfies the signature, determine a second group of related malicious entities, wherein the second group of related malicious entities satisfy the at least one related entity rule, wherein the second group of related malicious entities is related to the detected entity which satisfies the signature for the malicious software;
      compare entities included in the first group of related malicious entities to entities included in the second group of related malicious entities, wherein in response to a partial match, a discrepant portion of the second group of related malicious entities is detected as the variant of the malicious software, wherein the discrepant portion comprises one or more non-matching entities included in the second group of related malicious entities that do not match the one or more entities included in the first group of related malicious entities;
      generate variant data indicative of the difference between the first group of related malicious entities and the second group of related malicious entities;
      transfer the variant data to the server processing system, wherein the server dynamically generates a modified signature based on the variant data; and
      receive the modified signature from the server processing system based on the variant data, wherein the modified signature identifies the one or more non-matching entities included in the second group of related malicious entities.

6. A server processing system in data communication with the processing system of the system of claim 5, wherein the server processing system is configured to:
   receive, from the processing system, variant data indicative of the discrepant portion of the second group of related entities, wherein the processing system generates the variant data;
   modifying the signature associated with the first group of related malicious entities so as to detect the discrepant portion of the second group of related entities; and
   distributing the modified signature to one or more processing systems in data communication with the server processing system.

7. A computer program product comprising a non-transitory computer readable medium having a computer program recorded therein or thereon, the computer program enabling detection of a variant of malicious software in a processing system, wherein the computer program product configures the processing system to:

apply a signature for the malicious software in the processing system, wherein the signature is associated with a first group of related malicious entities;

receive at least one related entity rule from a server processing system, wherein the at least one entity rule is based on a property of at least on entity within the first group of related malicious entities;

in response to detecting an entity of the first group of related malicious entities which satisfies the signature, determine a second group of related malicious entities that satisfy the at least one related entity rule, wherein the second group of related malicious entities is related to the detected entity of the first group of related malicious entities which satisfies the signature for the malicious software;

compare entities included in the first group of related malicious entities to entities included in the second group of related malicious entities, wherein in response to a partial match, a discrepant portion of the second group of related entities is detected as the variant of the malicious software, wherein the discrepant portion comprises one or more non-matching entities included in the second group of related malicious entities that do not match the one or more entities included in the first group of related malicious entities; and generate variant data indicative of the difference between the first group of related malicious entities and the second group of related malicious entities;

transfer the variant data to the server processing system, wherein the server dynamically generates a modified signature based on the variant data;

receive the modified signature from the server processing system based on the variant data, wherein the modified signature identifies the one or more non-matching entities included in the second group of related malicious entities.

* * * * *